July 6, 1937.  R. D. WINKELMEYER  2,086,345
FENDER LAMP
Filed Dec. 6, 1935  2 Sheets-Sheet 1
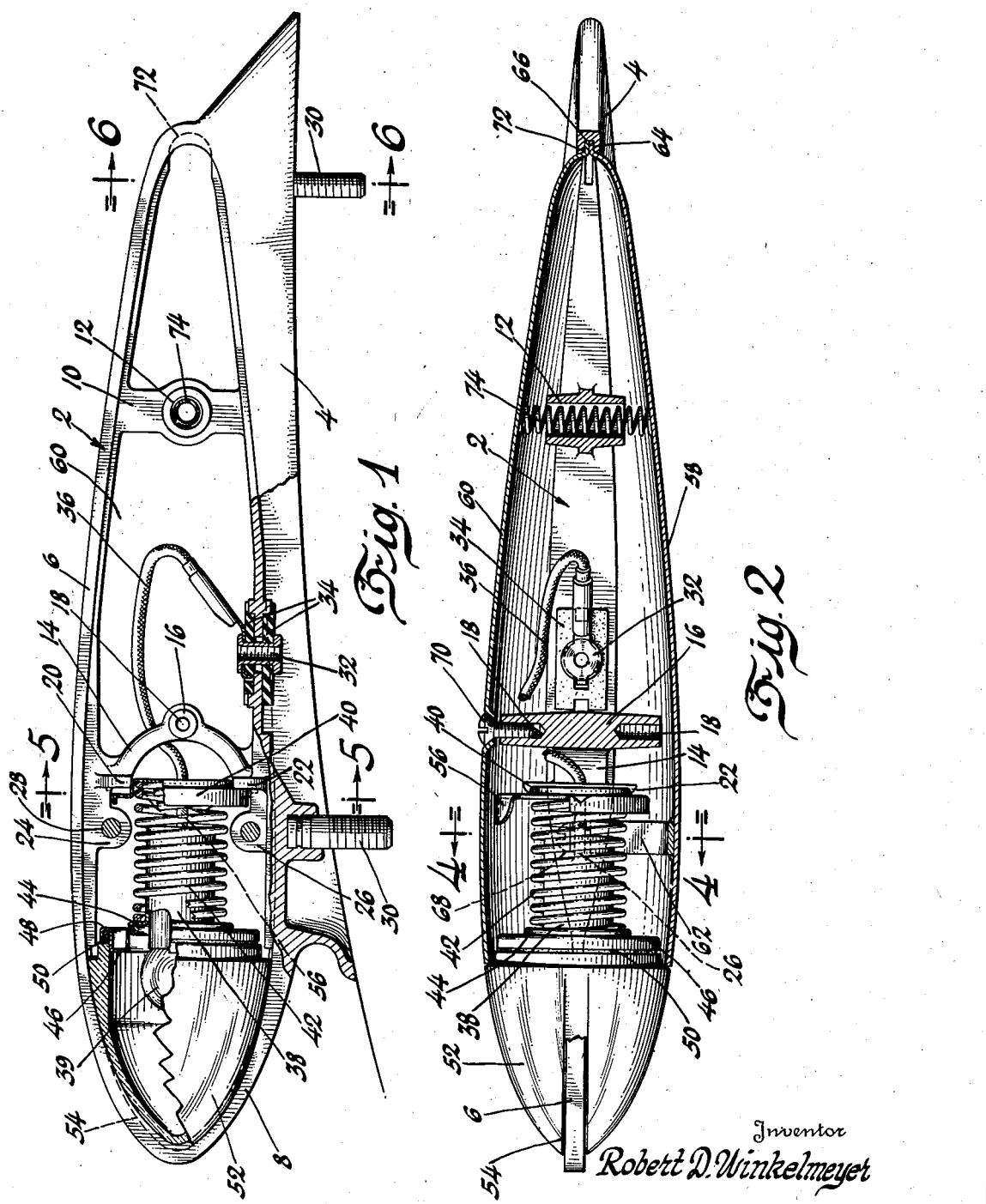
Inventor
Robert D. Winkelmeyer
By Blackmore, Spencer & Flint
Attorneys July 6, 1937.  R. D. WINKELMEYER  2,086,345
FENDER LAMP
Filed Dec. 6, 1935   2 Sheets-Sheet 2
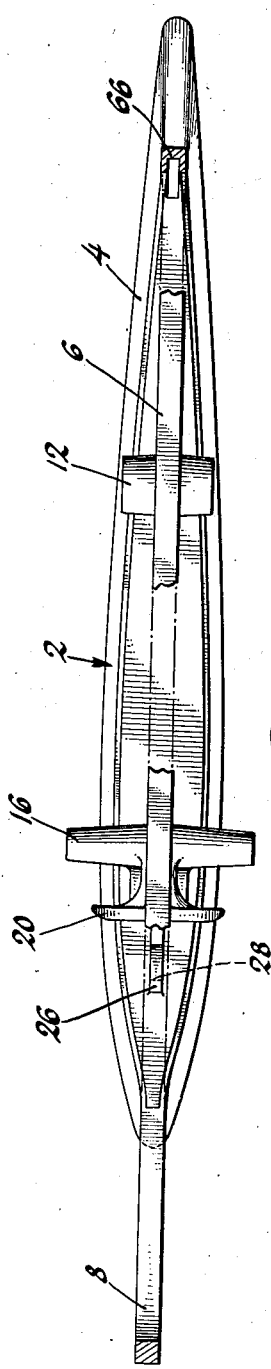
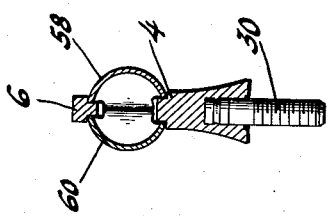
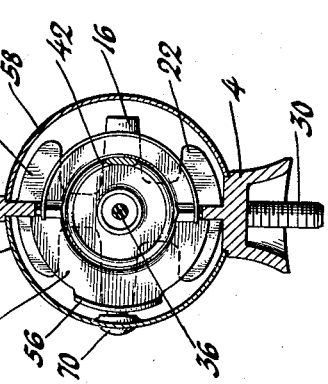
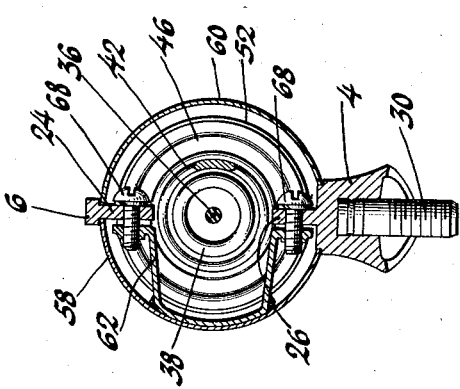
Inventor
Robert D. Winkelmeyer
By Blackmore, Spencer & Flint
Attorneys Patented July 6, 1937

2,086,345

UNITED STATES PATENT OFFICE 2,086,345

FENDER LAMP

Robert D. Winkelmeyer, Anderson, Ind., assignor to General Motors Corporation, Detroit, Mich., a corporation of Delaware Application December 6, 1935, Serial No. 53,115

12 Claims. (Cl. 240—8.1)

The present invention relates to illumination apparatus and more specifically to accessory lamps for automobiles.

The principal object of this invention is to provide a fender lamp of pleasing appearance which is practical to manufacture and easily serviced.

Further objects of my invention will become evident from the following specification which sets forth the embodiment of my invention as illustrated in the accompanying drawings, in which:

Figure 1 is a side elevation of my device, parts being broken away and shown in section.

Figure 2 is a horizontal section through the center of the fender lamp body, the forward portion being shown in full.

Figure 3 is a top view of the frame only, parts being broken away and shown in section.

Figure 4 is a sectional view taken on the line 4—4 of Figure 2.

Figures 5 and 6 are sectional views taken on the lines 5—5 and 6—6 of Figure 1 respectively.

Referring particularly to Figure 1, a cast outline frame 2 is provided whose shape in a vertical plane is generally elliptical with one end larger than the other. The integral base 4 of the frame is enlarged and provided with a curved lower surface adapted to match the surface to which the whole is to be attached, such as a fender. The frame 2 is composed of an upper curved portion 6 and a short lower curved portion 8 at the front which joins with the base 4 for the remainder of the lower portion. Extending vertically from the upper portion to the base toward the rear of the frame is a member 10 the central portion of which is elongated transversely to the main axis of the frame and drilled to form a tube 12 the purpose of which will be evident as the specification proceeds.

Toward the front of the frame there is a second bracket 14 extending across from top to bottom, integral with the frame. This bracket is U-shaped and carries at its center a trans-axial elongated portion 16 the outward ends of which are drilled and tapped as shown at 18. Due to the fact that the bracket is U-shaped, the portion 16 is spaced to the rear of the points at which the bracket ends join the frame proper. At the junction points the bracket is widened to form two flattened parallel tracks 20 and 22. Just ahead of these tracks are two inwardly extending lobes 24 and 26 having openings 28 therein.

All of the structure to this point is cast in one integral piece to form the main supporting frame of the fender lamp. Cast into the base 4 at spaced points are also two bolts 30 for mounting the whole on the fender.

An electrical terminal 32 is secured to the base 4 at the approximate center of the lamp, two insulating members 34 preventing contact therewith, the contact member being riveted down to clamp the two insulating members to the frame for supporting the whole. Beneath the inside overturned end of the contact 32 is secured one end of a conductor 36. The opposite end of the conductor is connected to a socket 38 which holds a bulb 39. Before the socket is connected permanently to the conductor, a flanged annular ring 40 and a helical coil spring 42 are threaded on the conductor. The spring 42 is of such a diameter so that one end rests within the flanged ring 40 and the body surrounds the socket member and abuts the rear face of the flared forward portion 44 of the socket. Secured to this edge 44 by interlocking therewith is an annular ring 46 which is inversely flanged a plurality of times and supports in an annular pocket 48 a sealing gasket 50.

A substantially conical lens 52 having a groove 54 in the outer face is adapted to fit within the forward curve of the frame with the frame fitting within the groove to position the lens. The gasket 50 is pressed against the rear circular lens edge by the ring 46 which is urged thereagainst by the spring 42 which forces the socket forward and presses against the ring 40 which bears against the flattened tracks 20 and 22 on the frame.

On one side of the annular ring 40 is an angular extension 56 by which the ring may be withdrawn from behind the spring by pulling on the extension and moving the ring over the tracks. This allows the socket and bulb to be removed for replacing with a new bulb.

In order to complete the streamline effect of the lamp, two curved side plates 58 and 60 are applied to opposite sides to enclose the socket, connections, etc. Side plate 58 has a bracket 62 welded thereto having threaded openings in the ends thereof. This plate extends from the rear of the lens to the rear of the frame, the small rearmost portion being flanged as at 64 to extend within a groove 66 in the rear of the frame. It is, of course, shaped to conform to the side of the frame. Screws 68 extend through the lobes 24 and 26 to secure the plate 58 in place and the flange 64 holds the rear portion in position. Side plate 60 is secured by screw 70 which threads into openings 18 in member 16 and which also has a rear flange 72 which extends into the groove 66 beside the flange 64. A helical spring 74 is held in the tube 12 and presses against the two side plates to keep them from rattling.

In replacing a bulb that has burned out, it is only necessary to remove screw 70 and side plate 60 and pull on angled tab 56 which pulls the pressed ring 40 from behind the spring 42 and allows the socket to slide back and the bulb may be removed.

I claim:

1. In a fender lamp, a multi-piece torpedo shaped body comprising a frame, side plates and a lens, resilient means within the body to force the lens into one end of the frame for support and means within the body accessible by the removal of one side plate to relieve the resilient pressure on the lens.

2. In a fender lamp, a multi-piece torpedo shaped body comprising a frame, side plates and a lens, a socket member within the body, resilient means forcing the socket member against the lens to keep the latter tightly to the frame and means accessible by the removal of one of the side plates to relieve the spring pressure and allow the socket to be removed.

3. In a fender lamp, a multi-piece torpedo shaped body comprising a frame, side plates and a lens, a socket member within the body adjacent the rear periphery of the lens, a spring surrounding the socket base and pressing the socket into engagement with the lens to keep the latter tightly in one end of the frame, a flanged plate against which the other end of the spring rests, means on the frame to frictionally support the plate and a lug on the plate whereby when one side plate is removed the plate may be radially withdrawn from the frame and the spring force relieved to withdraw the socket.

4. In a fender lamp comprising, a substantially elliptical strip frame, a substantially conical lens fitting within one end of the frame, the latter acting as a strap around the central outer face of the lens, a pair of bulbous side plates secured on either side of the frame extending from the lens to the tail of the frame and forming a torpedo shape of the whole.

5. In a fender lamp comprising, a substantially elliptical strip frame, a substantially conical lens fitting within one end of the frame, the latter acting as a strap around the central outer face of the lens, a pair of bulbous side plates secured on either side of the frame extending from the lens to the tail of the frame and forming a torpedo shape of the whole and illuminating means resiliently supported within the enclosure.

6. In a fender lamp comprising, a substantially elliptical strip frame, a substantially conical lens fitting within one end of the frame, the latter acting as a strap around the central outer face of the lens, a pair of bulbous side plates secured on either side of the frame extending from the lens to the tail of the frame and forming a torpedo shape of the whole and resilient means carried by the frame and urging the side plates apart to maintain tight joints.

7. In a lamp, an elongated strip frame having an enlarged base portion, a plurality of cross frame members, a lens fitting within the frame, resilient means to press the lens against the frame and supporting means for the resilient means frictionally held against portions of one of the cross frame members whereby the supporting means may be withdrawn by pulling sideways and the lens removed.

8. In a lamp, a substantially elliptical strip frame, a lens of substantially conical form fitting within one end of the frame, resilient means pressing the lens into contact with the frame to maintain it in position and a plurality of curved side plates extending from the rear of the lens to the rear of the frame, a flanged tip on the side plates, a groove in the frame end into which the tips fit for support and securing means for holding the plates to the opposite frame sides.

9. In a fender lamp, a thin outline frame, a lens of substantially conical form fitted within one end of the frame, a socket, resilient means pressing the socket against the lens to hold it in position, a plurality of side plates secured to the frame to give the whole the shape of a torpedo and spring means bearing against both side plates to prevent rattling.

10. In a fender lamp, a narrow outline frame substantially elliptical, a substantially conical lens fitted within one end of the frame so that the frame extends across the central portion of the outer lens face, cross brackets on the frame, a socket member, resilient means for pressing the socket member against the lens to support the latter, spaced tracks on one of the cross brackets, an annular member sliding radially on the tracks and supporting the opposite end of the resilient means, whereby when the annular member is removed by radial movement the socket and lens may be removed.

11. In a lamp, a longitudinal strip outline frame, a pair of side plates secured to the frame on opposite sides thereof, a lens supported by the frame at one end of the frame, the side plates and the lens forming the complete outer housing, a cross frame member within the housing and resilient means carried thereby exerting pressure on the rear lens face.

12. In a lamp, a longitudinal strip outline frame, a lens supported in one end thereof, a cross frame member whose central portion is bowed toward the rear, resilient means carried by the cross member pressing against the lens to maintain it in place whereby when the pressure is relieved the means may be moved rearwardly into the bow in the cross member and then removed.

ROBERT D. WINKELMEYER.